United States Patent
Pestl et al.

(10) Patent No.: US 10,652,447 B1
(45) Date of Patent: May 12, 2020

(54) SELFIE MIRROR SPEAKER

(71) Applicant: Forever Gifts, Inc., Arlington, TX (US)

(72) Inventors: Marcus Pestl, Arlington, TX (US); Hendra Wijaya, Arlington, TX (US)

(73) Assignee: Forever Gifts, Inc., Arlington, TX (US)

( * ) Notice: Subject to any disclaimer, the term of this patent is extended or adjusted under 35 U.S.C. 154(b) by 0 days.

(21) Appl. No.: 16/390,178

(22) Filed: Apr. 22, 2019

(51) Int. Cl.
| | |
|---|---|
| *H04N 5/225* | (2006.01) |
| *H04R 1/02* | (2006.01) |
| *F21V 33/00* | (2006.01) |
| *G02B 7/182* | (2006.01) |
| *A45D 42/10* | (2006.01) |
| *F21W 131/302* | (2006.01) |

(52) U.S. Cl.
CPC .......... *H04N 5/2257* (2013.01); *A45D 42/10* (2013.01); *F21V 33/004* (2013.01); *F21V 33/0056* (2013.01); *G02B 7/182* (2013.01); *H04N 5/2256* (2013.01); *H04R 1/028* (2013.01); *F21W 2131/302* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 2004/0246607 | A1* | 12/2004 | Watson | B60R 1/12 |
| | | | | 359/872 |
| 2011/0117959 | A1* | 5/2011 | Rolston | A46B 7/04 |
| | | | | 455/556.1 |
| 2016/0248981 | A1* | 8/2016 | Pauls | H04N 5/23293 |
| 2017/0118385 | A1* | 4/2017 | Vargas | A45D 42/10 |
| 2017/0164719 | A1* | 6/2017 | Wheeler | A45D 42/10 |
| 2017/0257543 | A1* | 9/2017 | Rowles | G06F 3/0317 |
| 2018/0048791 | A1* | 2/2018 | Johnson | H04N 5/2252 |
| 2018/0263362 | A1* | 9/2018 | Yang | A47G 1/04 |
| 2018/0270410 | A1* | 9/2018 | Lyle | H04N 5/23216 |
| 2019/0003699 | A1* | 1/2019 | Mondora | A45D 42/10 |

* cited by examiner

*Primary Examiner* — William B Perkey
(74) *Attorney, Agent, or Firm* — Kirby Drake

(57) ABSTRACT

A selfie mirror speaker may include a surface-mounted mirror that includes a module capable of capturing, broadcasting, and recording still photos, audio, and video of a user; and at least one mirror light, wherein the mirror is capable of being adjusted in height and angle for viewing, demonstrating, documenting, and sharing use and application of cosmetics, grooming techniques, skincare products, and related tools and accessories. The selfie mirror speaker includes an acoustic chamber connected to a bottom portion of the mirror, the acoustic chamber having a speaker integrated within the acoustic chamber. The acoustic chamber may include a downward-facing full-range driver on a lower end of the acoustic chamber; and a passive base isolator on an upper end of the acoustic chamber. The selfie mirror speaker may pair with at least one Bluetooth®-enabled device or MP3 player.

19 Claims, 4 Drawing Sheets

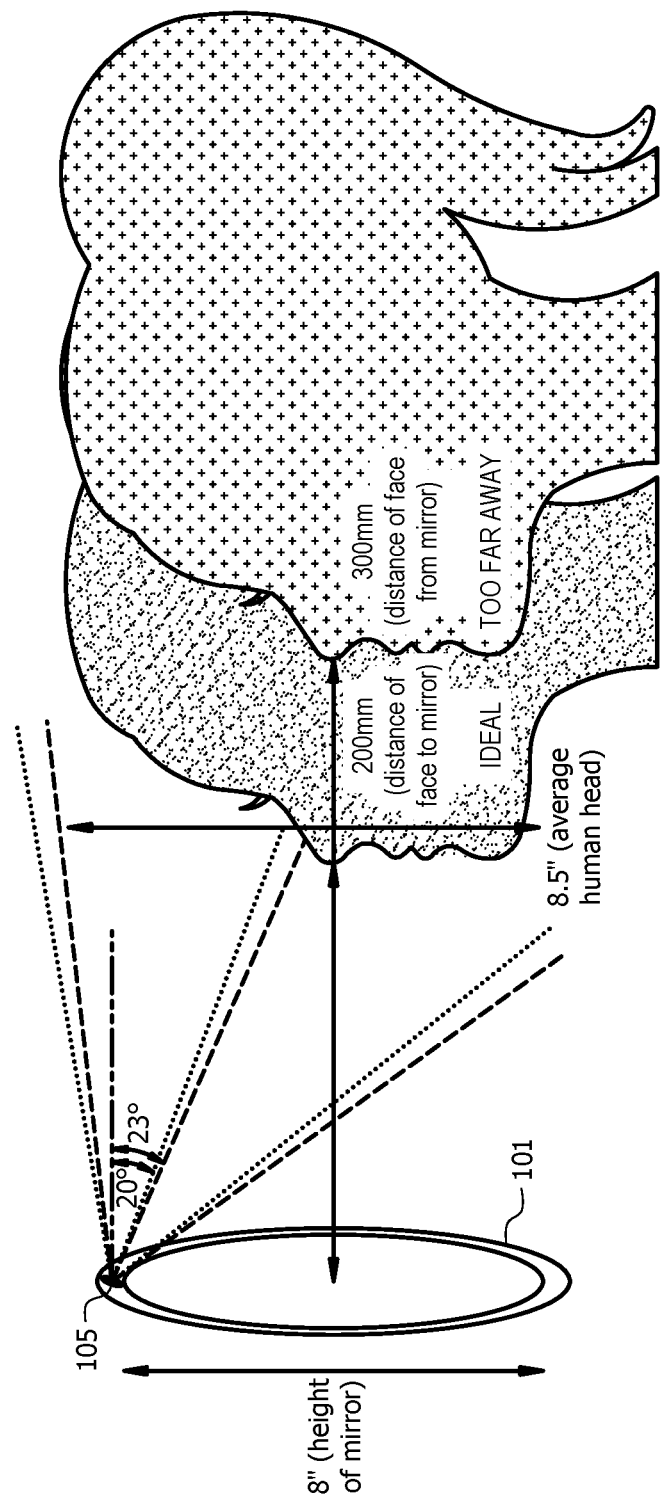

SELFIE MIRROR SPEAKER

TECHNICAL FIELD

The present disclosure relates, in general, to a mirror, and more specifically, to a selfie mirror speaker.

BACKGROUND

Mirrors can provide a reflection that may not produce a desirable self-portrait type image, more commonly known as a selfie. Conventionally, mirrors may not include smart technology and may not provide a speaker for optimizing use of the mirror without requiring multiple devices.

SUMMARY

Embodiments of the present disclosure may provide a selfie mirror speaker, the speaker comprising: a surface-mounted mirror that may include a module capable of capturing, broadcasting, and recording still photos, audio, and video of a user; and at least one mirror light, wherein the mirror may be capable of being adjusted in height and angle for viewing, demonstrating, documenting, and sharing use and application of cosmetics, grooming techniques, skincare products, and related tools and accessories. The speaker also may include a base connected to a bottom portion of the mirror, the base having a sound chamber (sometimes referred to as an acoustic chamber) in the interior of the base with a speaker integrated within the acoustic chamber. The mirror may be a dual-sided mirror with one side of the mirror providing a magnification. The speaker may further include a swivel that may connect to each side of the mirror and a top portion of the base to provide adjustability of the mirror. The at least one mirror light may be dual-sided. The speaker may further include a motion sensor that may activate the at least one mirror light. The motion sensor may be activated using infrared (IR) light. The motion sensor may activate other functionalities of the selfie mirror speaker. The at least one mirror light may have flash ring capability. The speaker also may include at least one night light having more than one solid light setting. The camera may have video resolution of 1080P when transmitting to a device and video resolution of 720P when livestreaming video. The speaker may further include a selfie button on the base or the acoustic chamber, thereby providing a single button for the user to touch to take a selfie photo and/or livestream video. The acoustic chamber may further include a downward-facing full-range driver on a lower end of the sound chamber; and a passive base isolator on an upper end of the sound chamber. The selfie mirror speaker may pair with at least one Bluetooth®-enabled device or MP3 player.

Other embodiments of the present disclosure may provide a selfie mirror speaker, the speaker comprising: a surface-mounted mirror including a module capable of capturing, broadcasting, and recording still photos, audio, and video of a user; and at least one mirror light, wherein the mirror may be capable of being adjusted in height and angle for viewing, demonstrating, documenting, and sharing use and application of cosmetics, grooming techniques, skincare products, and related tools and accessories. The speaker also may include a base connected to a bottom portion of the mirror, the base having an acoustic chamber in the interior of the base comprising: a downward-facing full-range driver on a lower end of the acoustic chamber; and a passive base isolator on an upper end of the acoustic chamber. The acoustic chamber may be a self-contained box within the interior of the base. The full-range driver may be an inverted 3-inch dynamic driver 202 and the passive base isolator may be an upward-facing 2-inch passive bass isolator. The acoustic chamber may provide a 5 W speaker output. The selfie mirror speaker may pair with at least one Bluetooth®-enabled device or MP3 player.

Further embodiments of the present disclosure may provide a selfie mirror speaker comprising a surface-mounted mirror including a module capable of capturing, broadcasting, and recording still photos, audio, and video of a user; and at least one mirror light, wherein the mirror may be capable of being adjusted in height and angle for viewing, demonstrating, documenting, and sharing use and application of cosmetics, grooming techniques, skincare products, and related tools and accessories. The speaker may include a base connected to a bottom portion of the mirror, the base having an acoustic chamber in the interior of the base with a speaker integrated within the acoustic chamber, wherein the selfie mirror speaker may pair with at least one Bluetooth®-enabled device or MP3 player. The speaker may further include at least one microphone, wherein the selfie mirror speaker may include Bluetooth® capability to allow for hands-free calling using the at least one microphone of the selfie mirror speaker.

BRIEF DESCRIPTION OF THE DRAWINGS

For a more complete understanding of this disclosure and its features, reference is now made to the following description, taken in conjunction with the accompanying drawings, in which:

FIG. 3 depicts adjustability of a selfie mirror speaker according to an embodiment of the present disclosure.

DETAILED DESCRIPTION

Embodiments of the present disclosure may generally provide a selfie mirror speaker that may provide a camera functionality to enable a user to take selfie photos and/or livestream video using the selfie mirror speaker. The selfie mirror speaker also may include a sound chamber (sometimes referred to as an acoustic chamber) in the base that provides a speaker.

Figure 1:
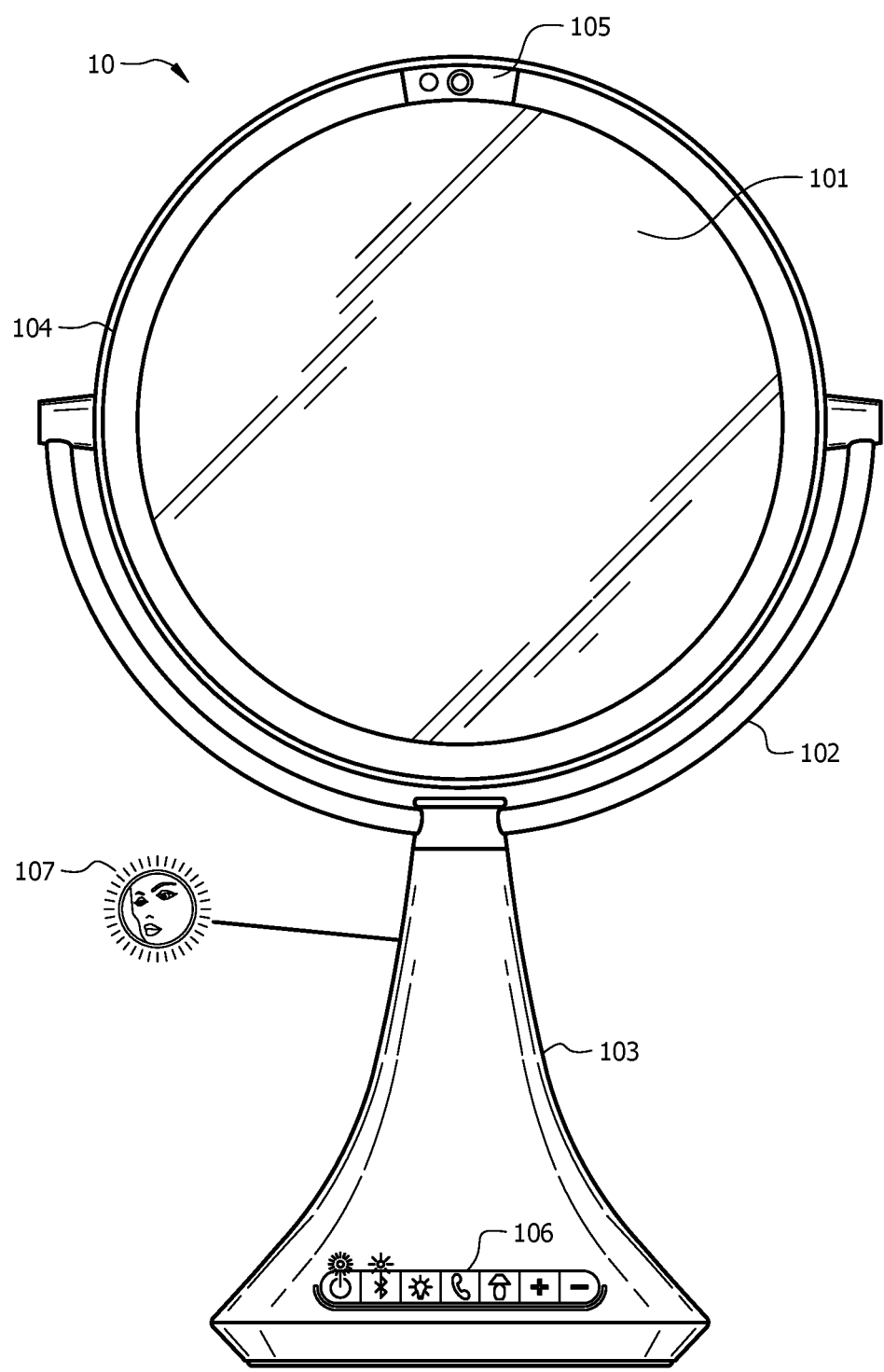
FIG. 1 is a perspective view of a selfie mirror speaker according to an embodiment of the present disclosure.

FIG. 1 depicts selfie mirror speaker 10 according to an embodiment of the present disclosure. Selfie mirror speaker 10 may include mirror 101. Mirror 101 may include dual-sided mirrors that may be approximately 8 inches in diameter. However, the diameters of mirror 101 may be larger or smaller without departing from the present disclosure. In an embodiment of the present disclosure, mirror 101 may provide 1× and 5× magnification; however, additional and/or other magnifications may be provided without departing from the present disclosure. It should be appreciated that one side of mirror 101 may not include magnification while the reverse side of mirror 101 may be rotated toward the user to provide a magnified view in embodiments of the present disclosure.

Mirror 101 may provide adjustability, such as in rotating mirror 101 to provide for magnification as previously described. Further, as depicted in FIG. 3, mirror 101 may be adjusted in height and/or distance from the user in embodiments of the present disclosure. In an embodiment of the present disclosure, mirror 101 may be approximately 8 inches in height and approximately 200-250 mm or approximately 8-10 inches' distance from the user. FIG. 3 also depicts an optimal (or ideal) angle for camera 105 of mirror 101 to be positioned relative to a user. In an embodiment of the present disclosure, camera 105 may be positioned at an angle of approximately 20-23 degrees. Adjustability also may be provided through swivel 102 that may connect to the sides of mirror 101 and the top portion of base 103. Selfie mirror speaker 10 also may provide telescoping adjustability through base 103, such as to adjust the height and/or angle of positioning of mirror 101, in embodiments of the present disclosure.

Selfie mirror speaker 10 may include at least one mirror light 104, which may be an 8 W LED at 4200K in an embodiment of the present disclosure. While an LED light may be described herein to form at least one mirror light 104, it should be appreciated that other lights may be incorporated into selfie mirror speaker 10 without departing from the present disclosure. At least one mirror light 104 may be dual-sided in an embodiment of the present disclosure so that there may be light to illuminate mirror 101 regardless which side of mirror 101 faces the user. However, there could be other embodiments of the present disclosure where at least one mirror light 104 may be single-sided, whether on the side of mirror 101 that is standard or the side that may provide magnification.

In some embodiments of the present disclosure, at least one mirror light 104 may be manually turned on and off; however, there may be other embodiments of the present disclosure where at least one mirror light 104 may be turned on and off through a motion sensor incorporated within selfie mirror speaker 10. If a motion sensor is used, at least one mirror light 104 may be activated from a range of approximately 120 degrees; however, the range may be larger or shorter without departing from the present disclosure. The range near distance may be approximately 0.328 feet or 0.1 m, and the range far distance may be approximately 3.28 feet or 1 m in embodiments of the present disclosure. However, the range near and far distances may differ without departing from the present disclosure. The motion sensor may be operated using infrared (IR) light to detect motion and turn on at least one mirror light 104 or activate other functionalities of selfie mirror speaker 10 in embodiments of the present disclosure; however, other methods to detect motion to activate at least one mirror light 104 or other functionalities of selfie mirror speaker 10 may be utilized without departing from the present disclosure.

At least one mirror light 104 may have adjustable brightness in embodiments of the present disclosure. On the camera-side of selfie mirror speaker 10, at least one mirror light 104 may have flash ring capability (FIG. 1), such that mirror 101 of selfie mirror speaker 10 may provide even illumination with few shadows visible in the resulting video and/or photographs because the origin of the light is very close to (and surrounds) the optical axis of the lens provided within selfie mirror speaker 10.

In addition to at least one mirror light 104, selfie mirror speaker 10 may include at least one night light as part of or in addition to at least one mirror light 104. In embodiments of the present disclosure, at least one night light may include three solid light settings (red, green, blue); however, more or fewer light settings having different colors may be provided without departing from the present disclosure. Embodiments of the present disclosure also may provide for color-changing lights including, but not limited to, white, red, blue, green, magenta, amber, aqua, and purple. Other colors may be included without departing from the present disclosure.

Selfie mirror speaker 10 may include camera 105 having the capability of taking photographs and/or livestreaming video in embodiments of the present disclosure. The video resolution may be 1080P when transmitting to a device, such as a mobile electronic device, or 720P when livestreaming video. The video aspect ratio may be 16:9 in an embodiment of the present disclosure. Still resolution may be 2 megapixels (MP) with a still aspect ratio of 16:9 in an embodiment of the present disclosure. The focal length may be 5.7 mm in an embodiment of the present disclosure. While the focal length is not adjustable in an embodiment of the present disclosure, it should be appreciated, however, there may be embodiments of the present disclosure where the focal length may be adjustable. While certain resolutions, focal lengths, and aspect ratios may be provided herein, it should be appreciated that other resolutions, focal lengths, or aspect ratios may be provided without departing from the present disclosure.

It should be appreciated that selfie mirror speaker 10 may provide a plurality of controls or buttons 106 in base 103 that may be utilized to turn the power on or off, connect and disconnect Bluetooth pairing, adjust magnification, light strength, color, angles, volume, and other aspects of selfie mirror speaker 10 in embodiments of the present disclosure. While controls or buttons 106 are depicted in FIG. 1, it should be appreciated that more, fewer, or different controls or buttons may be provided in base 103 without departing from the present disclosure. It also should be appreciated that controls or buttons 106 may be provided in a location on selfie mirror speaker 10 other than in base 103 without departing from the present disclosure.

Selfie button 107 may be provided on base 103 in embodiments of the present disclosure. Selfie button 107 may allow a user to touch a single button to take a selfie and/or livestream video. While selfie button 107 is depicted as being positioned on the backside of base 103 in FIG. 1, it should be appreciated that selfie button 107 may be positioned in a different location on selfie mirror speaker 10 without departing from the present disclosure.

Figure 2A:
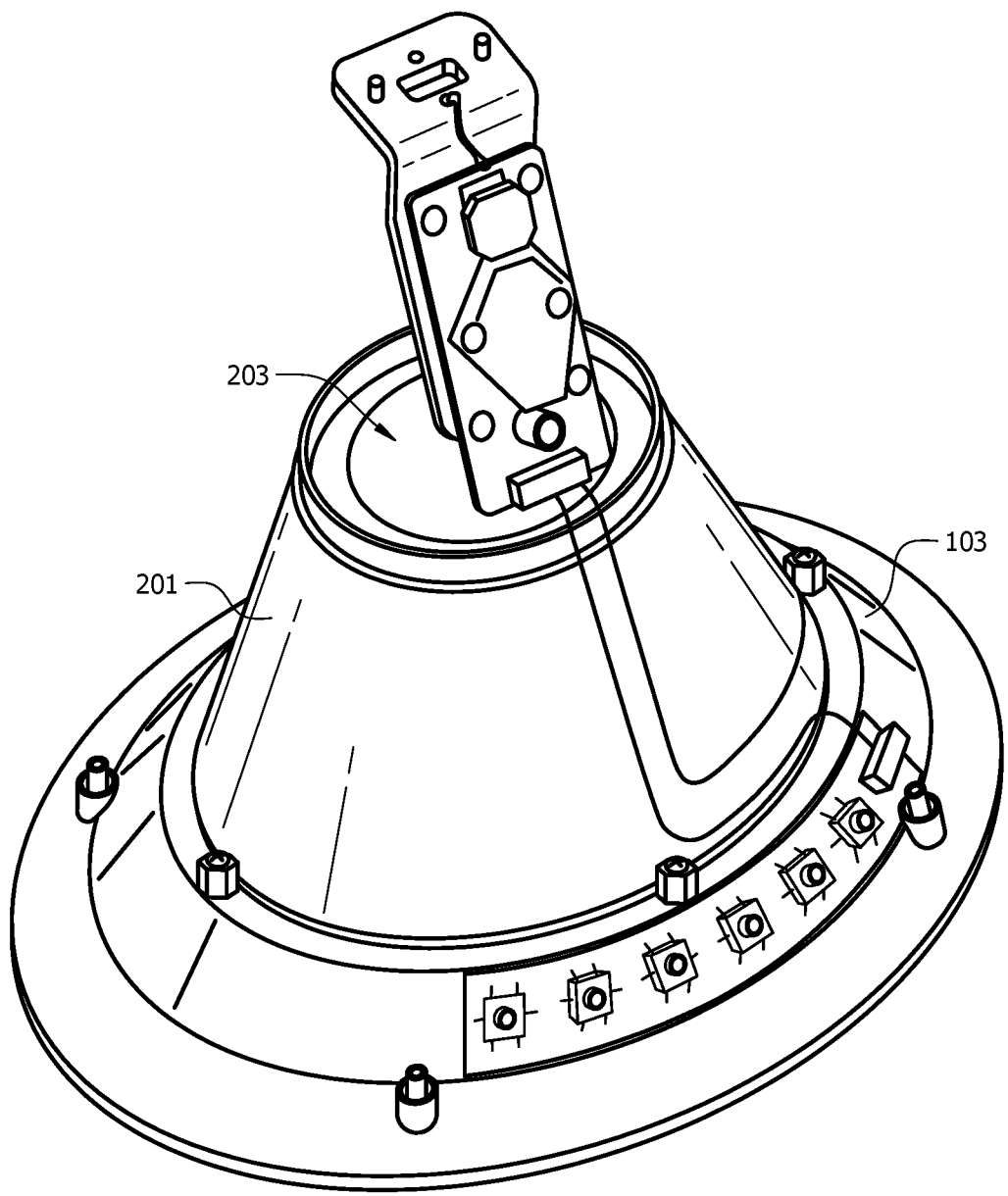
FIG. 2A is a perspective view of a base of a selfie mirror speaker according to an embodiment of the present disclosure.
Figure 2B:
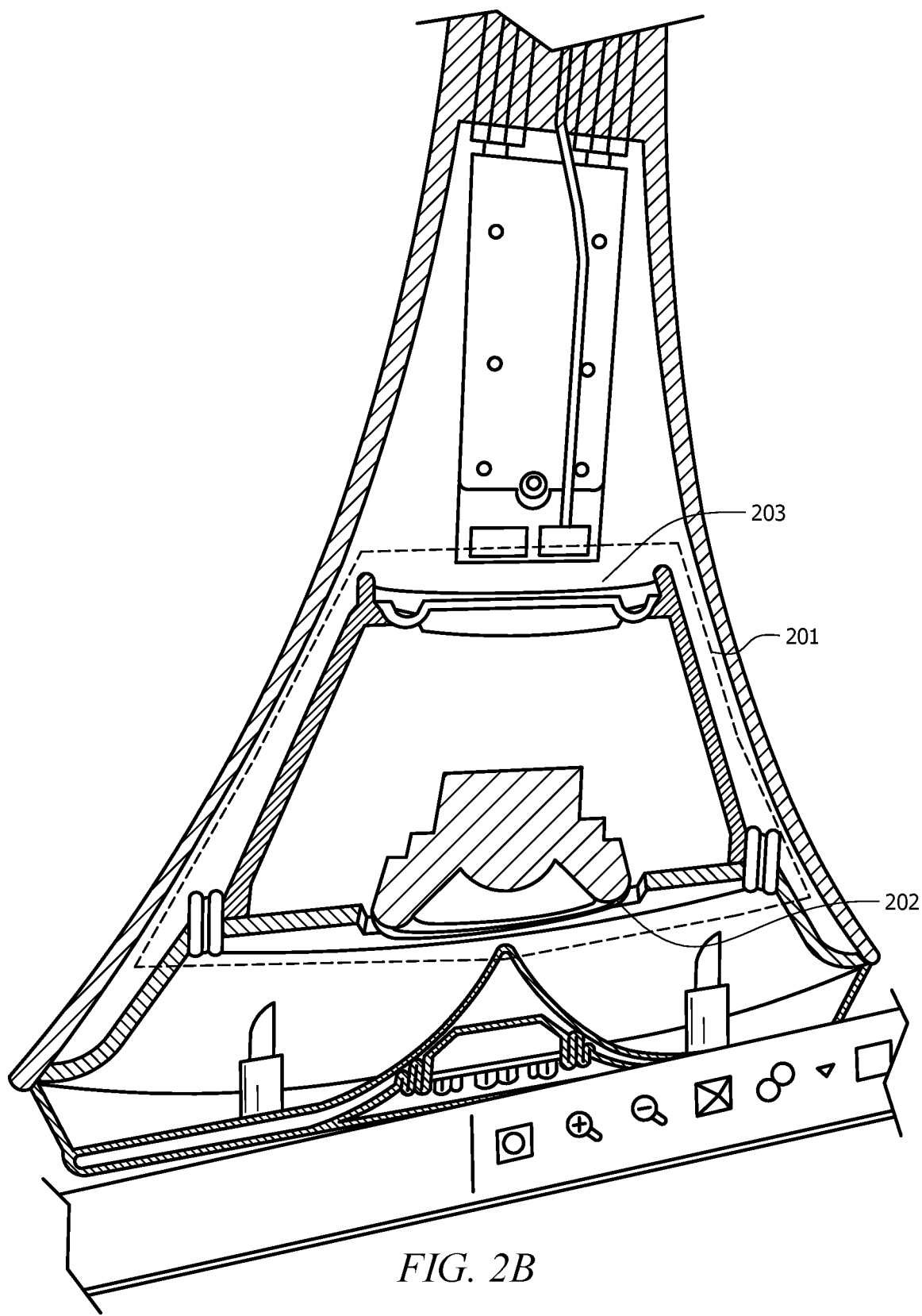
FIG. 2B is an exploded view of the acoustic chamber in the base of FIG. 2A according to an embodiment of the present disclosure.

FIG. 2A is a perspective view of base 103 of a selfie mirror speaker according to an embodiment of the present disclosure. FIG. 2B is an exploded view of sound chamber 201 in base 103 of FIG. 2A according to an embodiment of the present disclosure. Sound chamber 201 may be provided in an interior of base 103 of selfie mirror speaker 10 to house the one or more speakers. Accordingly, base 103 itself may house sound chamber 201 and may provide a self-contained speaker chamber/sound box (i.e., a box-in-a-box). This construction may create a more rigid box to transmit sound than base 103 may be able to transmit on its own. Sound chamber 201 may include full-range driver 202 on one end and base isolator 203 on the other end. Without sound chamber 201 housed in base 103 according to embodiments of the present disclosure, sound quality may suffer because main speaker driver 202 according to embodiments of the present disclosure faces downward. The opposite side of sound chamber 201 may include passive bass isolator 203 to further enhance bass sound and overall sound quality. Thus, sound transmission may be improved due to the self-contained nature of sound chamber/box 201 within base 103.

Selfie mirror speaker 10 may include a 5 W speaker output in an embodiment of the present disclosure. The speaker output may provide inverted 3-inch dynamic driver 202 and upward-facing 2-inch passive bass isolator/radiator 203 in embodiments of the present disclosure. The speaker drivers and layout also may include a full range 5 W dynamic driver and passive bass radiators in an embodiment of the present disclosure.

The body of selfie mirror speaker 10 may be formed of plastic, such as acrylonitrile butadiene styrene (ABS). The light ring may be formed of acrylic, such as poly-methyl methacrylate (PMMA). The speaker grill may be formed of steel. Silicone may be used to form the control panel and covers for selfie mirror speaker 10. The at least one mirror may be formed of glass, while the frame and arm of the at least one mirror may be formed of steel. While different materials are described herein, it should be appreciated that other materials may be used without departing from the present disclosure.

It should be appreciated that selfie mirror speaker 10 may pair with any Bluetooth®-enabled device, including but not limited to, a tablet, a laptop or other computer, a smart phone (IOS or Android), MP3 players, and/or other mobile electronic devices. Accordingly, audio sources may include Bluetooth-enabled devices and/or MP3 players. However, it should be appreciated that MP3 players may be limited to 3.5 mm aux input in some embodiments of the present disclosure. Selfie mirror speaker 10 may include Bluetooth® version 5.0+BR+EDR with an approximately 33 foot/10 m connection range according to an embodiment of the present disclosure. It also should be appreciated that inclusion of Bluetooth® capability in selfie mirror speaker 10 may allow for hands-free calling in embodiments of the present disclosure.

Total harmonic distortion (THD) plus Noise may be less than approximately 10% in embodiments of the present disclosure. The signal to noise (S/N) ratio may be more than approximately 95 dB in embodiments of the present disclosure. The frequency response may be approximately 120 Hz-20 KHz (−10 dB) in embodiments of the present disclosure. Various audio formats may be supported including, but not limited to, high-efficiency advanced audio encoding (HE-ACC), low-complexity advanced audio encoding (LC-ACC), MP3, Vorbis, WAV linear pulse code modulation (LPCM), and free lossless audio codec (FLAC). Other audio formats may be supported without departing from the present disclosure. Streaming quality may be approximately 16 bit/48 kHZ in embodiments of the present disclosure.

Selfie mirror speaker 10 may further include at least one microphone that may have near-field (×1) range and may have a range of approximately 1.7 feet/0.5 m in an embodiment of the present disclosure. However, there may be embodiments of the present disclosure where the at least one microphone may have a range other than near-field and/or have a different range distance without departing from the present disclosure. The at least one microphone also may have a background noise limit of approximately 35 dB in an embodiment of the present disclosure; however, the background noise limit may be adjusted up or down without departing from the present disclosure.

Selfie mirror speaker 10 may also include at least one USB connection (1×2.1 A) in an embodiment of the present disclosure. Selfie mirror speaker 10 may further include a charging cable/cord, which may be a 12V, 4A adaptor (6 feet/183 cm) in an embodiment of the present disclosure.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A selfie mirror speaker, the speaker comprising:
 a surface-mounted mirror comprising:
  a module capable of capturing, broadcasting, and recording still photos, audio, and video of a user;
  at least one mirror light; and
  a swivel that connects to each side of the surface-mounted mirror and provides for angle adjustability of the surface-mounted mirror, and
 a base connected to a bottom portion of the surface-mounted mirror, the base having telescopic capabilities to adjust the height of the surface-mounted mirror and housing an acoustic chamber, the acoustic chamber having a speaker integrated within the acoustic chamber,
 wherein the surface-mounted mirror is capable of being adjusted in height using the telescopic capabilities of the base and in angle using the swivel for viewing, demonstrating, documenting, and sharing use and application of cosmetics, grooming techniques, skincare products, and related tools and accessories.

2. The selfie mirror speaker of claim 1, wherein the mirror is a dual-sided mirror with one side of the mirror providing a magnification.

3. The selfie mirror speaker of claim 1, wherein the at least one mirror light is dual-sided.

4. The selfie mirror speaker of claim 1 further comprising: a motion sensor that activates the at least one mirror light.

5. The selfie mirror speaker of claim 4, wherein the motion sensor is activated using infrared (IR) light.

6. The selfie mirror speaker of claim 4, wherein the motion sensor activates other functionalities of the selfie mirror speaker.

7. The selfie mirror speaker of claim 1, wherein the at least one mirror light has flash ring capability.

8. The selfie mirror speaker of claim 1 further comprising: at least one night light having more than one solid light setting.

9. The selfie mirror speaker of claim 1, wherein the module has video resolution of 1080P when transmitting to a device and video resolution of 720P when livestreaming video.

10. The selfie mirror speaker of claim 1 further comprising:
 a selfie button, thereby providing a single button for the user to touch to take a selfie photo and/or livestream video.

11. The selfie mirror speaker of claim 1, the acoustic chamber further comprising:
 a downward-facing full-range driver on a lower end of the acoustic chamber; and
 a passive base isolator on an upper end of the acoustic chamber.

12. The selfie mirror speaker of claim 1, wherein the selfie mirror speaker pairs with at least one wireless connection enabled device or MP3 player.

13. A selfie mirror speaker, the speaker comprising:
a surface-mounted mirror comprising:
- a module capable of capturing, broadcasting, and recording still photos, audio, and video of a user;
- at least one mirror light; and
- a swivel that connects to each side of the surface-mounted mirror and provides for angle adjustability of the surface-mounted mirror, a base connected to a bottom portion of the surface-mounted mirror, the base having telescopic capabilities to adjust the height of the surface-mounted mirror and housing an acoustic chamber, the acoustic chamber having a speaker integrated within the acoustic chamber, the acoustic chamber comprising:
- a downward-facing full-range driver on a lower end of the acoustic chamber; and
- a passive base isolator on an upper end of the acoustic chamber, wherein the surface-mounted mirror is capable of being adjusted in height using the telescopic capabilities of the base and in angle using the swivel for viewing, demonstrating, documenting, and sharing use and application of cosmetics, grooming techniques, skincare products, and related tools and accessories.

14. The selfie mirror speaker of claim 13, wherein the acoustic chamber is a self-contained box within the interior of a base.

15. The selfie mirror speaker of claim 13, wherein the full-range driver is an inverted 3-inch dynamic driver 202 and the passive base isolator is an upward-facing 2-inch passive bass isolator.

16. The selfie mirror speaker of claim 13, wherein the acoustic chamber provides a 5 W speaker output.

17. The selfie mirror speaker of claim 13, wherein the selfie mirror speaker pairs with at least one wireless connection enabled device or MP3 player.

18. A selfie mirror speaker, the speaker comprising:
a surface-mounted mirror comprising:
- a module capable of capturing, broadcasting, and recording still photos, audio, and video of a user;
- at least one mirror light; and
- a swivel that connects to each side of the surface-mounted mirror and provides for angle adjustability of the surface-mounted mirror, a base connected to a bottom portion of the surface-mounted mirror, the base having telescopic capabilities to adjust the height of the surface-mounted mirror and housing an acoustic chamber, the acoustic chamber having a speaker integrated within the acoustic chamber, wherein the surface-mounted mirror is capable of being adjusted in height using the telescopic capabilities of the base and in angle using the swivel for viewing, demonstrating, documenting, and sharing use and application of cosmetics, grooming techniques, skincare products, and related tools and accessories, and wherein the selfie mirror speaker pairs with at least one wireless connection enabled device or MP3 player.

19. The selfie mirror speaker of claim 18 further comprising:
at least one microphone, wherein the selfie mirror speaker includes wireless connection capability to allow for hands-free calling using the at least one microphone of the selfie mirror speaker.

* * * * *